United States Patent
Nakayasu

(10) Patent No.: US 8,139,513 B2
(45) Date of Patent: Mar. 20, 2012

(54) WIRELESS BASE STATION APPARATUS CAPABLE OF EFFECTIVELY USING WIRELESS RESOURCES ACCORDING TO SORTS OF DATA

(75) Inventor: Kanada Nakayasu, Tokyo (JP)

(73) Assignee: NEC Corporation, Tokyo (JP)

( * ) Notice: Subject to any disclaimer, the term of this patent is extended or adjusted under 35 U.S.C. 154(b) by 1070 days.

(21) Appl. No.: 11/971,773

(22) Filed: Jan. 9, 2008

(65) Prior Publication Data

US 2008/0186942 A1    Aug. 7, 2008

(30) Foreign Application Priority Data

Jan. 18, 2007  (JP) ................................. 2007-009188

(51) Int. Cl.
*H04B 7/00* (2006.01)
*H04L 12/66* (2006.01)

(52) U.S. Cl. ..................... 370/310; 370/310.1; 370/352; 370/338

(58) Field of Classification Search ........................ None
See application file for complete search history.

(56) References Cited

U.S. PATENT DOCUMENTS

| | | | | |
|---|---|---|---|---|
| 5,570,355 | A * | 10/1996 | Dail et al. | 370/352 |
| 5,982,748 | A * | 11/1999 | Yin et al. | 370/232 |
| 7,257,083 | B2 * | 8/2007 | Bansal et al. | 370/235 |
| 2003/0072264 | A1 * | 4/2003 | Mo et al. | 370/235 |
| 2003/0123392 | A1 | 7/2003 | Ruutu et al. | |
| 2004/0165528 | A1 * | 8/2004 | Li et al. | 370/230 |
| 2005/0286559 | A1 * | 12/2005 | Miernik et al. | 370/468 |

FOREIGN PATENT DOCUMENTS

| | | |
|---|---|---|
| EP | 0713347 A2 | 5/1996 |
| JP | 07099526 A | 4/1995 |
| JP | 2000010842 A | 1/2000 |
| JP | 2000174771 A | 6/2000 |
| JP | 2004312739 A | 11/2004 |
| JP | 2005269624 A | 9/2005 |
| JP | 2005339730 A | 12/2005 |
| JP | 2006087084 A | 3/2006 |
| WO | 9748201 A1 | 12/1997 |
| WO | 2005006150 A | 1/2005 |

OTHER PUBLICATIONS

European Search Report for EP 08 25 0250 completed Apr. 18, 2011.
Japanese Office Action for JP2007/009188 issued Oct. 18, 2011.

* cited by examiner

*Primary Examiner* — Steven H Nguyen

(57) ABSTRACT

A wireless base station apparatus according to the present invention has a plurality of wireless resources allocated in correspondence with communication processings on real-time data, non-real-time data and shared data, and a control section. The control section stores a table for recording states of use of the wireless resources, and upon receiving a signal for requesting setting some of the wireless resources for new real-time data, and if no released resource is found by referring to the table, allocates part of wireless resources for communication processing on the shared data to wireless resources for communication processing on the new real-time data, and upon receiving a signal for requesting setting some of the wireless resources for new shared data, and if no released resource is found by referring to the table, allocates part of wireless resources for communication processing on the non-real-time data to wireless resources for communication processing on the new shared data.

6 Claims, 6 Drawing Sheets

FIG.2

| resource number | use state flag | service priority flag | reservation flag | resource borrowing flag |
|---|---|---|---|---|
| 1 | 1 | 15 | 0 | 0 |
| 2 | 2 | 8 | 0 | 0 |
| 3 | 2 | 8 | 0 | 0 |
| 4 | 1 | 15 | 0 | 0 |
| 5 | 1 | 15 | 0 | 0 |
| 6 | 2 | 4 | 0 | 1 |
| 7 | 2 | 4 | 0 | 1 |
| 8 | 2 | 4 | 0 | 1 |
| 9 | 2 | 4 | 0 | 1 |
| 10 | 3 | 1 | 1 | 0 |
| 11 | 3 | 1 | 1 | 0 |
| 12 | 1 | 15 | 0 | 0 |
| 13 | 1 | 15 | 0 | 0 |
| 14 | 2 | 8 | 1 | 0 |
| 15 | 2 | 8 | 1 | 0 |
| 16 | 2 | 8 | 1 | 0 |
| 17 | 2 | 8 | 1 | 0 |
| 18 | 2 | 2 | 0 | 0 |
| 19 | 2 | 2 | 0 | 0 |
| 20 | 2 | 2 | 0 | 1 |
| 21 | 2 | 2 | 0 | 1 |
| 22 | 0 | − | 0 | 0 |
| 23 | 1 | 15 | 0 | 0 |
| 24 | 1 | 15 | 0 | 0 |
| 25 | 1 | 15 | 0 | 0 |
| 26 | 1 | 15 | 0 | 0 |
| 27 | 3 | 10 | 0 | 0 |
| 28 | 3 | 10 | 0 | 0 |
| 29 | 3 | 10 | 0 | 0 |
| 30 | 3 | 10 | 0 | 0 |
| 31 | 3 | 10 | 0 | 0 |
| 32 | 3 | 10 | 0 | 0 |

WIRELESS BASE STATION APPARATUS CAPABLE OF EFFECTIVELY USING WIRELESS RESOURCES ACCORDING TO SORTS OF DATA

This application is based upon and claims the benefit of priority from Japanese Patent Application No. 2007-009188 filed on Jan. 18, 2007, the content of which is incorporated by reference.

BACKGROUND OF THE INVENTION

1. Field of the Invention

The present invention relates to a wireless base station apparatus and a wireless resource management method.

2. Description of the Related Art

In the characteristics of code division multiple access (CDMA) communication systems in recent years, the maximum bit rate has been increased and burst data such as packet data has been increased among data to be handled. Also, the width of variation in bit rate has been increased. A wireless base station is provided with a plurality of wireless resources which are modules for performing wireless communication processing in response to "call"s. Needs for wireless resource capacities have also increased in correspondence with data to be handled.

On the other hand, shared services such as high speed downlink packet access/high speed uplink packet access (HS-DPA/HSUPA) for sharing wireless resources by allocating the wireless resources in a certain control cycle in an optimized time-division manner have begun. For example, Japanese Patent Laid-Open No. 2004-312739 discloses such a service which sets different numbers of wireless resources according to requests from user terminals instead of securing the same numbers of wireless resources at the time of transmission/reception of data to or from the user terminals.

Since the above-mentioned data and data used in this service are simultaneously supported under the same CDMA system, there is a problem that unless the wireless resources in the CDMA wireless base station are allocated at a high speed in an optimum way, wasteful use of physically-finite wireless resources of the CDMA wireless base station occurs and the efficiency of use of wireless communication sections is reduced. In future, there is a possibility of an increase in demand for transmission/reception of continuous data which needs to be transmitted in real time at a constant bit rate. It is necessary to efficiently use wireless resources of a limited capacity according to the sorts and amounts of data to be handled.

SUMMARY OF THE INVENTION

An object of the present invention is to provide a wireless base station apparatus and a wireless resource management method enabling effective use of wireless resources according to sorts of data to be handled.

A wireless base station apparatus according to the present invention comprises: a plurality of wireless resources allocated in correspondence with communication processings on three sorts of data: real-time data which is continuous data and which needs to be treated in real time, non-real-time data which is burst data and which does not need to be treated in real time, and shared data used in shared service in which the burst data is transferred in a time-division manner by being communication-processed in a predetermined control cycle; and a control section for storing a table for recording states of use of the wireless resources, and upon receiving a signal for requesting setting some of the wireless resources for new real-time data, and if no released resource is found as unused one of the wireless resources by referring to the table, for identifying one or more wireless resources allocated for communication processing on the shared data by referring to the table and for allocating part of identified wireless resources for communication processing on the new real-time data, and upon receiving a signal for requesting setting some of the wireless resources for new shared data, and if no released resource is found as unused one of the wireless resources by referring to the table, for identifying one or more wireless resources allocated for communication processing on the non-real-time data by referring to the table and for borrowing part of identified wireless resources for communication processing on the new shared data.

According to the present invention, when a request for a resource setting is newly made with respect to real-time data such as conversation data, conversation data is treated with priority over other sorts of data, because conversation is urgent in some case. Since processing for transferring shared data is performed on a control cycle-by-control cycle basis, a wireless resource used for shared data can be released at a cycle transition point, in contrast with a case of transmitting non-real-time data. It is, therefore, possible to deal with urgency and prevent occurrence of a communication error by setting a wireless resource for shared data as a wireless resource for new real-time data. On the other hand, non-real-time data is randomly transmitted in burst form. Therefore, when the rate of data flow per unit time is low, a wireless resource used for transmission of non-real-time data can be temporarily used for other data in the course of its use. Temporary borrowing of a wireless resource does not suffice for communication processing on real-time data. However, a wireless resource can be temporarily borrowed for shared service performing data transfer processing in a control cycle. In this way communication can be efficiently performed according to the sort of data to be handled.

According to the present invention, setting and release of wireless resources can be efficiently performed according to requests made for service for communication of real-time data, service for communication of non-real-time data in burst form, and shared service. Thus, wireless resources can be effectively used.

The above and other objects, features and advantages of the present invention will become apparent from the following description with reference to the accompanying drawings which illustrate examples of the present invention.

BRIEF DESCRIPTION OF THE DRAWINGS

FIG. 2 is a diagram showing an example of a wireless resource management table;

DETAILED DESCRIPTION OF THE PREFERRED EMBODIMENTS

A wireless base station apparatus according to an exemplary embodiment of the present invention is characterized by releasing or borrowing a wireless resource according to a characteristic of a sort of data already processed for communication when a wireless resource setting request is newly made. Description of exemplary embodiments will be made by assuming that the wireless communication system is CDMA.

Exemplary Embodiment 1

Figure 1:
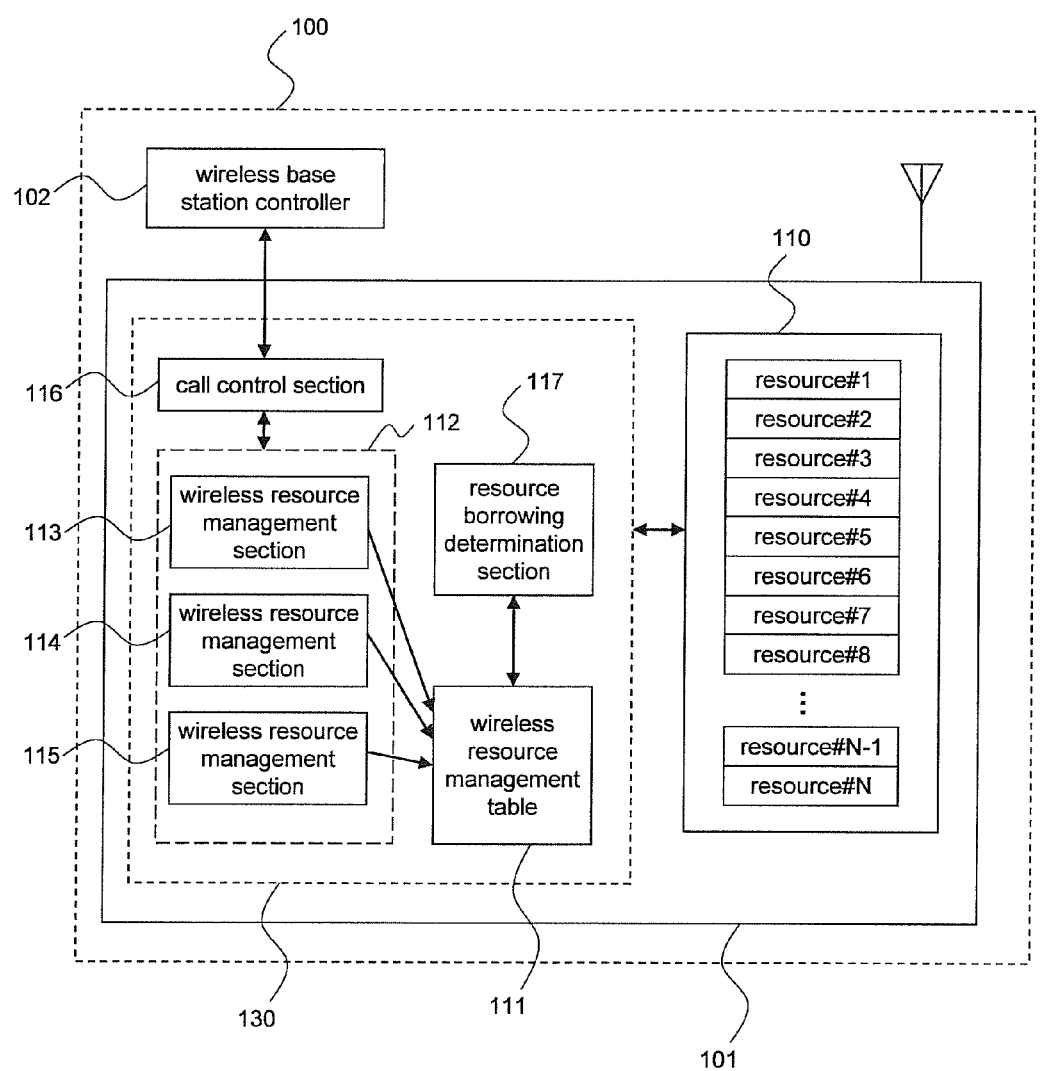
FIG. 1 is a block diagram showing an example of configuration of a wireless base station apparatus in an exemplary embodiment 1 of the present invention.

A configuration of a wireless base station apparatus according to an exemplary embodiment of the present invention will be described. FIG. 1 is a block diagram showing an example of configuration of the apparatus.

Wireless base station system 100 shown in FIG. 1 is a system compatible with the HSxPA functions and having wireless base station apparatus 101 and wireless base station controller 102. Communication connection is made between wireless base station apparatus 101 and wireless base station controller 102. One wireless base station controller 102 may control a plurality of wireless base station apparatuses 101.

When wireless base station controller 102 receives a resource setting request signal as a signal for requesting setting a resource from a user terminal via wireless base station apparatus 101, it transmits the signal to wireless base station apparatus 101. The resource setting request signal includes information on sorts of data handled by the user terminal and the number of resources required for communication of the data. Wireless base station controller 102 has the same configuration as that of an ordinary wireless base station controller. Therefore detailed description will not be made of the configuration of wireless base station controller 102.

Wireless base station apparatus 101 is provided with wireless resource group 110 including a plurality of wireless resources of a predetermined bandwidth and control section 130 which allocates some of the wireless resources in correspondence with the amount of a sort of data to be handled.

In control section 130, a central processing unit (CPU) (not shown) for executing processing in accordance with a program and a memory (not shown) for storing the program are provided. Control section 130 corresponds to control means in accordance with the present invention.

Control section 130 is configured to have call control section 116 connected to wireless base station controller 102, resource borrowing determination section 117, wireless resource management table 111 in which information for control of assignment of wireless resources is described, and wireless resource management section group 112 which sets/releases wireless resources suitable for a wireless service to be provided according to a resource setting request from wireless base station controller 102, or sets/releases wireless resources in a predetermined control cycle in an optimum way.

There are three kinds of wireless service to be provided. The first one is a communication service on real-time data which needs to be treated in real time, i.e., continuous data such as voice conversation data or streaming data. The second one is a communication service on non-real-time data which does not need to be treated in real time, i.e., burst data such as Web page data. The third one is a shared service such as HSDPA or HSUPA which performs communication processing on burst data in a predetermined control cycle and transfers the processed data in a time-division manner.

Wireless resource management section group 112 includes wireless resource management section 113, wireless resource management section 114, and wireless resource management section 115 in correspondence with sorts of data.

Wireless resource management section 113 performs resource management including setting/releasing real-time data such as voice conversation data transmitted at a constant communication rate and occupying a resource, and performs communication processing thereof. Wireless resource management section 114 performs resource management with respect to non-real-time data such as Web page data occupying a resource but transmitted at a communication rate randomly changed, and performs communication processing thereof. Wireless resource management section 115 performs resource management with respect to shared data in the above-described shared service and performs communication processing thereof. The amount of data transmitted per unit time varies depending on the sort of data. Therefore the wireless resource management sections require different numbers of resources. The number of resources to be set also varies depending on information on the number of resources contained in the resource setting request signal.

The communication processing capacity of wireless base station apparatus 101 is schematically expressed by wireless resource group 110 shown in FIG. 1. Communication processing can be allocated to a plurality of wireless resources (hereinafter referred to simply as "resource") of a predetermined band width. Each resource can be used in common independently of sorts of data such as real-time data and non-real-time data. In FIG. 1, different identifiers for the resources are indicated by "#k (k is an arbitrary integer from 1 to N, N is an integer equal to or larger than 2)". Each wireless resource management section performs baseband processing in a CDMA wireless communication section by using one or a plurality of resources.

Resource borrowing determination section 117 measures the data rate per unit time with respect to a resource set in advance for communication processing on one sort of data to determine whether or not the resource can be borrowed for temporary interruptive use for one of the other services.

Call control section 116 identifies a sort of data from the resource setting request signal received from wireless base station controller 102. According to the identification result, call control section 116 selects one of the three wireless management sections to perform resource management and makes the selected wireless resource management section perform processing.

The CPU (not shown) provided in control section 130 executes processing according to a program to virtually form call control section 116, wireless resource management section 113, wireless resource management section 114, wireless resource management section 115 and resource borrowing determination section 117 in wireless base station apparatus 101.

Description will be made of wireless resource management table 111. FIG. 2 is a diagram showing an example of the wireless resource management table. In the present exemplary embodiment, the number of resources is assumed to be 32.

As shown in the table in FIG. 2, a flag indicating the state of use of each individual resource (hereinafter called "use state flag"), a flag indicating the state of reservation (hereinafter called "reservation flag"), a flag indicating a priority for each service (hereinafter called "service priority flag") and a resource borrowing flag indicating whether or not temporary borrowing is possible are associated with the resources in the wireless resource group 110. Each wireless resource management section in wireless resource management section group 112 can access and refer to this table. The role of each flag will be described below.

Description will first be made of "use state flag".

This flag indicates which resource is being used by which wireless resource management section. Each wireless resource management section in wireless resource management section group 112 sets this flag to ON (set value=1, 2, or 3)/OFF (set value=0). When wireless resource management section 113 uses the resource, it sets the flag to 1. When wireless resource management section 114 uses the resource, it sets the flag to 2. When wireless resource management section 115 uses the resource, it sets the flag to 3. When the resource is not in use, the flag is 0. When the wireless resource management section releases the resource, the wireless resource management section sets the flag to "unused" (set value=0).

"Reservation flag" shown in FIG. 2 will be described.

This flag is set for reservation of some of the resources in a situation where there is a resource shortage. The wireless resource management section 115 which manages shared service sets this flag to ON/OFF. In shared service, communication processing is performed on a control cycle basis and, therefore, a processing interrupt is easily made. If each resource is released at a control cycle transition point, communication can be normally performed and occurrence of a communication error can be prevented.

"Service priority flag" shown in FIG. 2 will be described.

This flag takes an arbitrary value as an index indicating a priority with which service is provided. It is assumed that decreasing order of priority is, for example, 14, 13, 12, . . . from the highest priority 15. Real-time service managed by wireless resource management section 113 is always given the highest priority, and wireless resource management section 113 sets flag 15 at all times. Real-time data is treated with the highest priority because telephone conversation may be urgent in some case. Wireless resource management section 114 and wireless resource management section 115 can take a plurality of values in correspondence with Quality of Service (QoS) necessary for non-real-time data to be handled. Setting as to which value is to be set in the flag with respect to which QoS is described in advance in a program.

"Resource borrowing flag" shown in FIG. 2 will be described. This flag indicates whether or not the corresponding resource can be temporarily borrowed from one of the other services. Since each resource used for communication of real-time data cannot be borrowed, this flag is set with respect to the resources with the use state flag set to 2.

Setting of this flag is determined by resource borrowing determination section 117. Resource borrowing determination section 117 measures the rate of flow of data in a certain unit time with respect to the resource used for non-real-time data handled by wireless resource management section 114. If this data flow rate is equal to or lower than a certain constant value, resource borrowing determination section 117 permits temporary use of the resource for one of the other services and sets this flag to 1. This constant value is a threshold value for determination as to whether or not the resource presently in use should be permitted to be temporarily used for one of the other services.

The operation of the wireless base station apparatus according to the present exemplary embodiment will now be described.

Figure 3A:
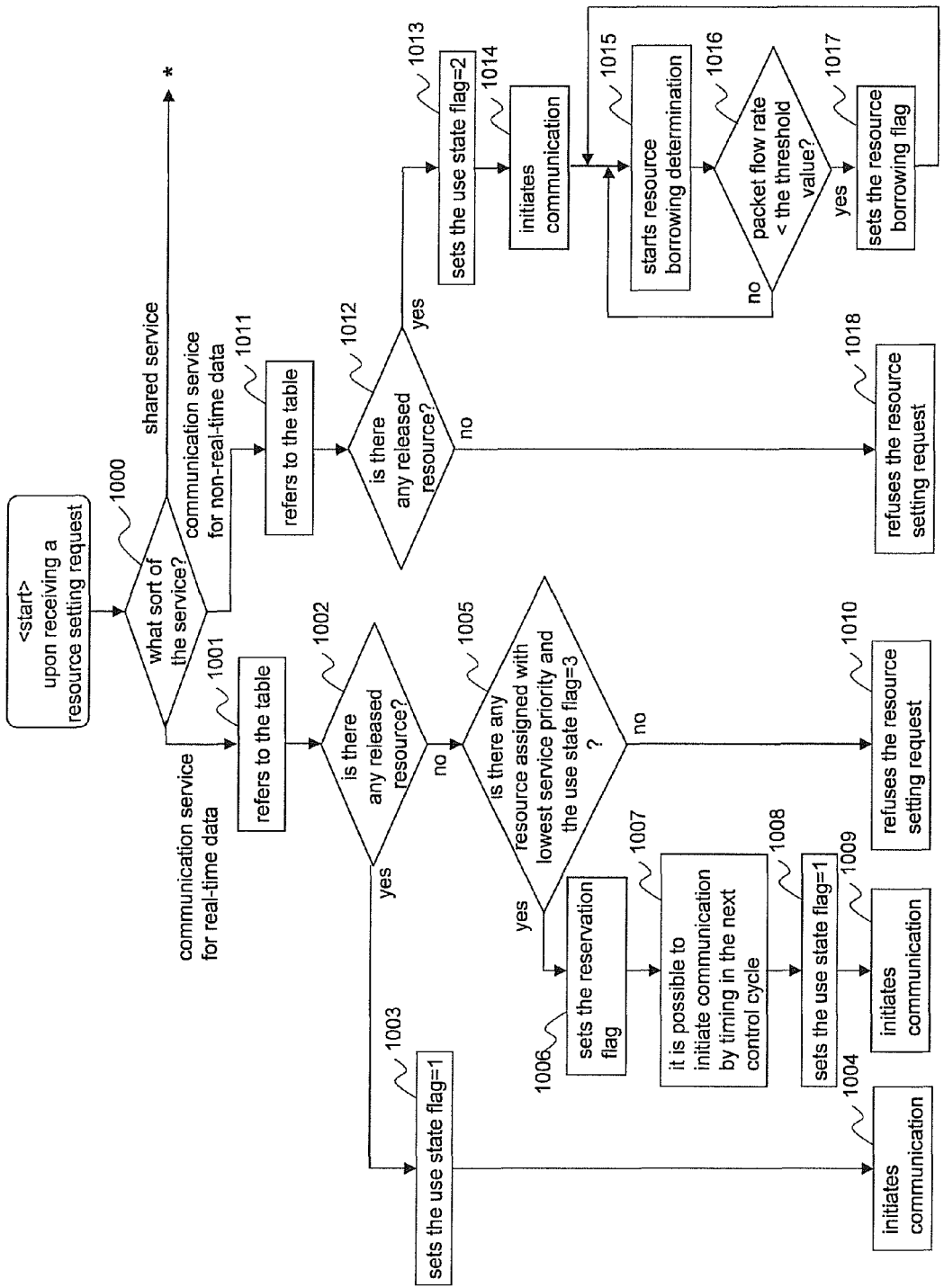
FIGS. 3A and 3B are flowcharts showing the procedure of operation of the wireless base station apparatus in exemplary embodiment 1.
Figure 3B:
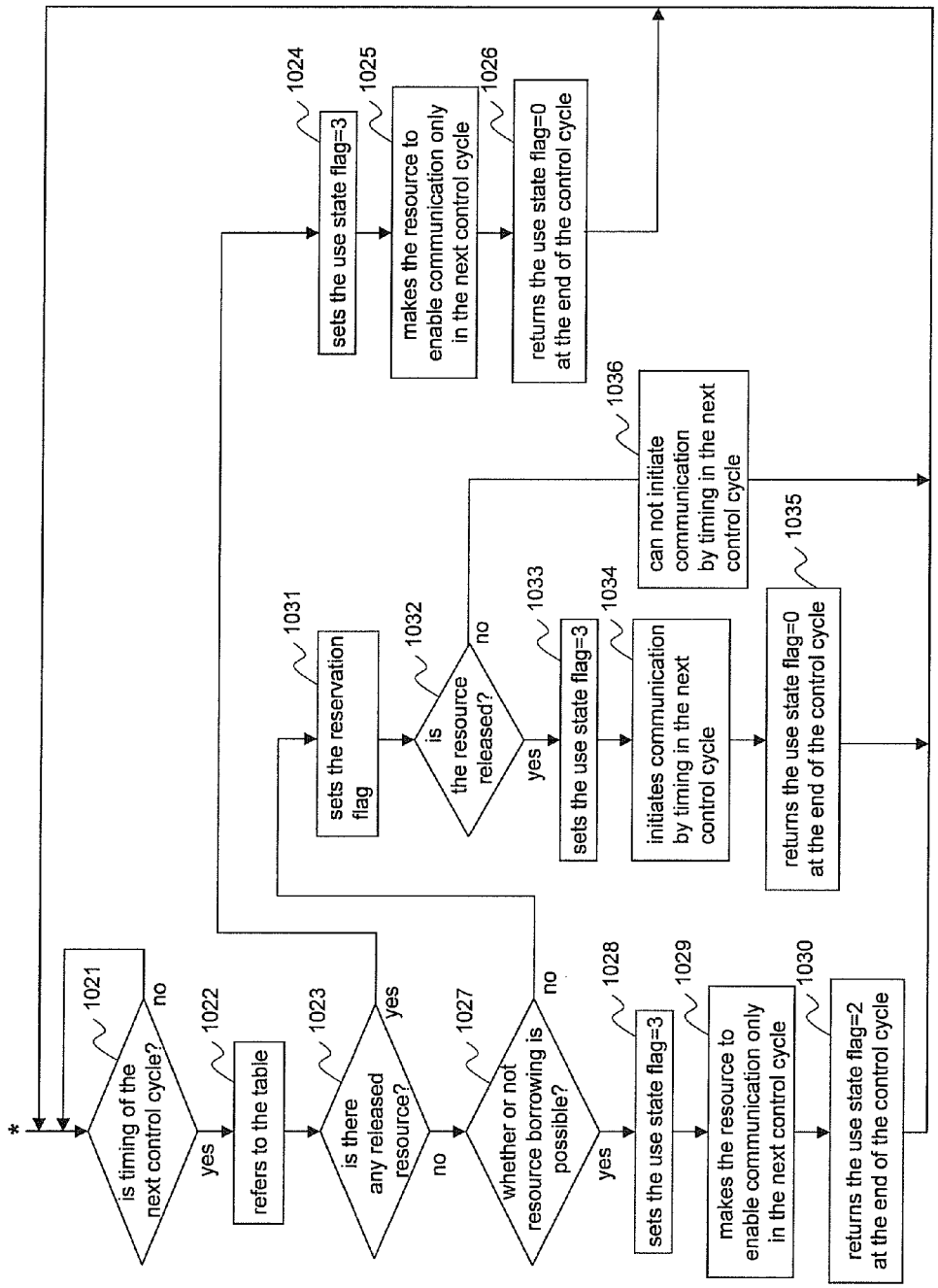

FIGS. 3A and 3B are flowcharts showing the procedure of operation of the wireless base station apparatus according to the present exemplary embodiment. The flowcharts of FIGS. 3A and 3B are linked by a symbol (*).

Wireless base station controller 102 first receives a resource setting request signal from a user terminal and transmits the request signal to wireless base station apparatus 101.

Call control section 116 in wireless base station apparatus 101 receives the resource setting request signal from wireless base station controller 102, recognizes a sort of data in the Wireless base station controller 102, selects the suitable wireless resource management section from wireless resource management section group 112 in correspondence with the recognized sort of data and instructs the selected wireless resource management section to perform processing (step 1000).

Description will be made of a case where the sort of data is real-time data (e.g., speech or streaming data).

If call control section 116 determines in step 1000 that the sort of data is real-time data, it instructs wireless resource management section 113 to perform processing. Wireless resource management section 113 instructed refers to wireless resource management table 111 (step 1001) and checks whether there is any released resource (with use state flag=0) (step 1002). If wireless resource management section 113 determines that there are some released resources, it secures the necessary number of resources and sets the use state flags on the resources to 1 (step 1003). Thereafter, wireless resource management section 113 actually makes the resource setting on resource group 110 and initiates communication (step 1004).

If wireless resource management section 113 determines in step 1002 that there is no released resource, it refers to the service priority flags and the use state flags in wireless resource management table 111 and checks whether there is any resource assigned with the lowest service priority and the use state flag set to 3 (for shared service) (step 1005). If some the resources match this condition, wireless resource management section 113 sets the reservation flags on the matching resources to 1 (step 1006).

Wireless resource management section 115 hands over the resources with the reservation flags set to 1 to wireless resource management section 113 by timing in the next control cycle of shared service (step 1007). Wireless resource management section 113 sets the use state flags on the received resources to 1 (step 1008), thereafter makes the resource setting actually on resource group 110 and initiates communication of real-time data (step 1009).

In step 1005, if there is no resource assigned with the lowest service priority and the use state flag set to 3 (for shared service), wireless resource management section 113 refuses the resource setting request (step 1010).

Description will be made of a case where the sort of data is non-real-time data.

If call control section 116 determines in step 1000 that the sort of data is real-time data, it instructs wireless resource management section 114 to perform processing. Wireless resource management section 114 instructed refers to wireless resource management table 111 (step 1001) and checks whether there is any released resource (with use state flag=0) (step 1012). If there are some released resources, wireless resource management section 114 secures the necessary number of resources and sets the use state flags to 2 (step 1013). Thereafter, wireless resource management section 114 actually makes the resource setting on resource group 110 and initiates communication (step 1014).

Resource borrowing determination section 117 starts resource borrowing determination during communication processing (step 1015) to check whether or not the packet flow rate is higher than the threshold value (step 1016). If the rate of packet flow in the unit time is lower than the threshold value, resource borrowing determination section 117 sets the resource borrowing flag to 1 (step 1017). If the rate of packet flow in the unit time is equal to or higher than the threshold value, resource borrowing determination section 117 maintains the resource borrowing flag at 0. The process then returns to step 1015 and resource borrowing determination section 117 continues monitoring the packet flow rate. In step 1012, if there is no released resource, wireless resource management section 114 refuses the resource setting request (step 1018).

Description will be made of a case where the sort of data is shared data for shared service such as HSDPA or HSUPA. The operation of wireless resource management section 115 at the time of execution of shared service will be described with reference to FIG. 4.

Figure 4:
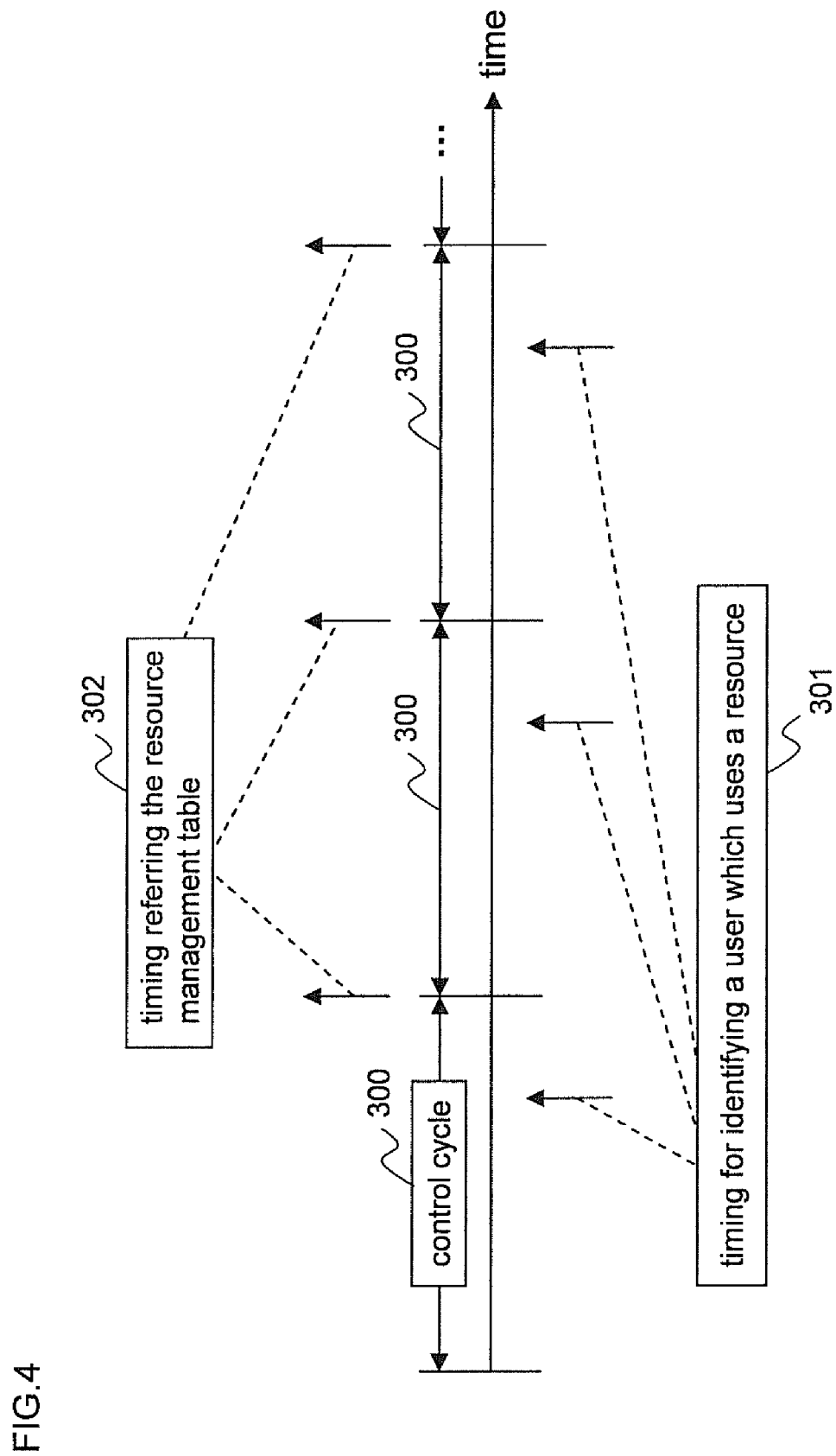
FIG. 4 is a diagram for explaining the operation of a wireless resource management section when shared service is executed.

As shown in FIG. 4, wireless resource management section 115 identifies, in each predetermined control cycle 300, by timing 301, a user who is to perform wireless communication by using some of the wireless resources in the next control cycle. Wireless resource management section 115 determines the number of resources necessary for wireless communication with respect to the identified user and refers to wireless resource management table 111 by timing 302. The necessary resources change with transition from one cycle to another in the predetermined control cycles. Therefore wireless resource management section 115 refers to wireless resource management table 111 by corresponding timing.

If call control section 116 identifies the sort of data as shared data in step 1000 of FIG. 3A, it instructs wireless resource management section 115 to perform processing. Wireless resource management section 115 instructed determines the necessary number of resources and, by timing in the next control cycle (step 1021), refers to wireless resource management table 111 (step 1022) and checks whether or not there are the necessary released resources (with use state flag=0) (step 1023).

In step 1023, if the necessary released resources exist in the next control cycle, wireless resource management section 115 secures the resources and sets the use state flag to 3 (step 1024). Thereafter, wireless resource management section 115 actually makes the resource setting on wireless resource group 110 to enable communication only in the next control cycle (step 1025), and returns the use state flag to 0 at the end of the control cycle (step 1026).

In step 1023, if the necessary released resources do not exist in the next control cycle (use state flag=1 or 2), wireless resource management section 115 refers to the resource borrowing flags in wireless resource management table 111 and determines whether or not resource borrowing is possible (step 1027).

In step 1027, if some of the resource borrowing flags in wireless resource management table 111 have set values 1, wireless resource management section 115 checks whether or not the resource with the flags set to 1 suffice for the necessary number of resources. If wireless resource management section 115 determines that the resources with the flags set to 1 suffice for the necessary number of resources, it sets the use state flags to 3 by timing in the next control cycle with respect to the resources with the resource borrowing flags set to 1 in order to execute borrowing of the resources (step 1028). Wireless resource management section 115 actually makes the resource setting on wireless resource group 110 to enable communication only in the next control cycle by using the resources (step 1029), and returns the use state flags on the borrowed resources to 2 at the end of the control cycle (step 1030).

In step 1027, if none of the resource borrowing flags in wireless resource management table 111 has the set value 1, or if the necessary number of resources cannot be secured, wireless resource management section 115 determines that it is impossible to perform resource borrowing, and sets the reservation flags corresponding to the necessary number of resources to 1 with respect to arbitrary ones of the resources.

When the resources with the reservation flags set to 1 are released before the actual communication time (step 1032), wireless resource management section 115 changes the use state flags on the released resources to 3 (step 1033), makes the resource setting on wireless resource group 110 by timing in the next control cycle (step 1034), and returns the use state flags to 0 at the end of the control cycle (step 1035).

When wireless resource management section 113 or 114 releases the resources from the state under its management, it may refer to wireless resource management table 111 and change the use state flags on the resources to 3 simultaneously with releasing the resources if the reservation flags on the resources that have been under its management have the set value 1. Wireless resource management section 113 or 114 may serve as wireless resource management section 115 to change the flags indicating the states of use of the resources in this way.

If the resources with the reservation flags set to 1 are not released in step 1032, wireless resource management section 115 determines that communication cannot be performed in the next control cycle (step 1036), and returns the setting of the reservation flags from 1 to 0 (=canceled). Wireless resource management section 115 again refers to the entire wireless resource management table 111 and returns the process to determination as to the existence/nonexistence of released resources in step 1023.

In the wireless base station apparatus according to the present exemplary embodiment, real-time data such as conversation is treated with priority over other sorts of data when a resource setting request for its communication is newly made, because conversation is urgent in some case. Since processing for transferring shared data is performed on a control cycle-by-control cycle basis, a wireless resource used for shared data can be released at a cycle transition point, in contrast with a case of transmitting non-real-time data. It is, therefore, possible to deal with urgency and prevent occurrence of a communication error by setting a wireless resource for shared data as a wireless resource for new real-time data.

On the other hand, non-real-time data is randomly transmitted in burst form. Therefore, when the rate of data flow per unit time is low, a wireless resource used for transmission of non-real-time data can be temporarily used for other data in the course of its use. Temporary borrowing of a wireless resource does not suffice for communication processing on real-time data. However, a wireless resource can be temporarily borrowed for shared service performing data transfer processing in a control cycle. In the present exemplary embodiment, a wireless resource for non-real-time data is borrowed at a resource setting request newly made for shared service, thus making it possible to efficiently perform communication according to the sort of data to be handled.

In the case of setting a wireless resource for shared data is set for new real-time data, a wireless resource for shared data with a lower priority may be allocated to limit the bad influence on an important communication.

According to the present exemplary embodiment, setting and release of wireless resources can be efficiently performed according to requests made for service for communication of real-time data, service for communication of non-real-time data in burst form, and shared service. Thus, wireless resources can be effectively used.

Borrowing of resources and making a reservation of use of resources make it possible to efficiently allocate wireless resources to burst data at a dynamically changed bit rate and to improve the efficiency of use of resources and the efficiency of use of wireless communication sections.

An increase in wireless communication capacity is achieved by improving the efficiency of use of resources. The need to newly develop a wireless base station apparatus having the performance corresponding to the increased wireless communication capacity is eliminated to limit the increase in manufacturing cost of the wireless base station apparatus.

While in the present exemplary embodiment wireless resource management table 111 is stored in control section 130, the arrangement may alternatively be such that a storage section is provided in wireless base station apparatus 101 and the table is stored in the storage section. Also, the table may be stored in any of call control section 116, wireless resource management section group 112 and wireless resource group 110 in control section 130. The place in which wireless resource management table 111 is stored can be freely selected provided that it is within wireless base station apparatus 101.

While resource borrowing determination section 117 is shown separately from the three constituent units: call control section 116, wireless resource management section group 112 and wireless resource group 110, resource borrowing determination section 117 may be included in one of these three constituent units.

Further, while it is assumed that information on the number of resources is included in the resource setting request signal from a user terminal, the necessary number of resources may be determined from a sort of data.

Exemplary Embodiment 2

In exemplary embodiment 1, wireless resource management table 111 is provided in a memory in control section 130 or the storage section (not shown) to enable each wireless resource management sections to refer thereto. In exemplary embodiment 2 of the present invention, information in the table is transmitted to wireless management section group 112 by a certain protocol as an interface between wireless resource management section group 112 and wireless resource group 110.

Figure 5:
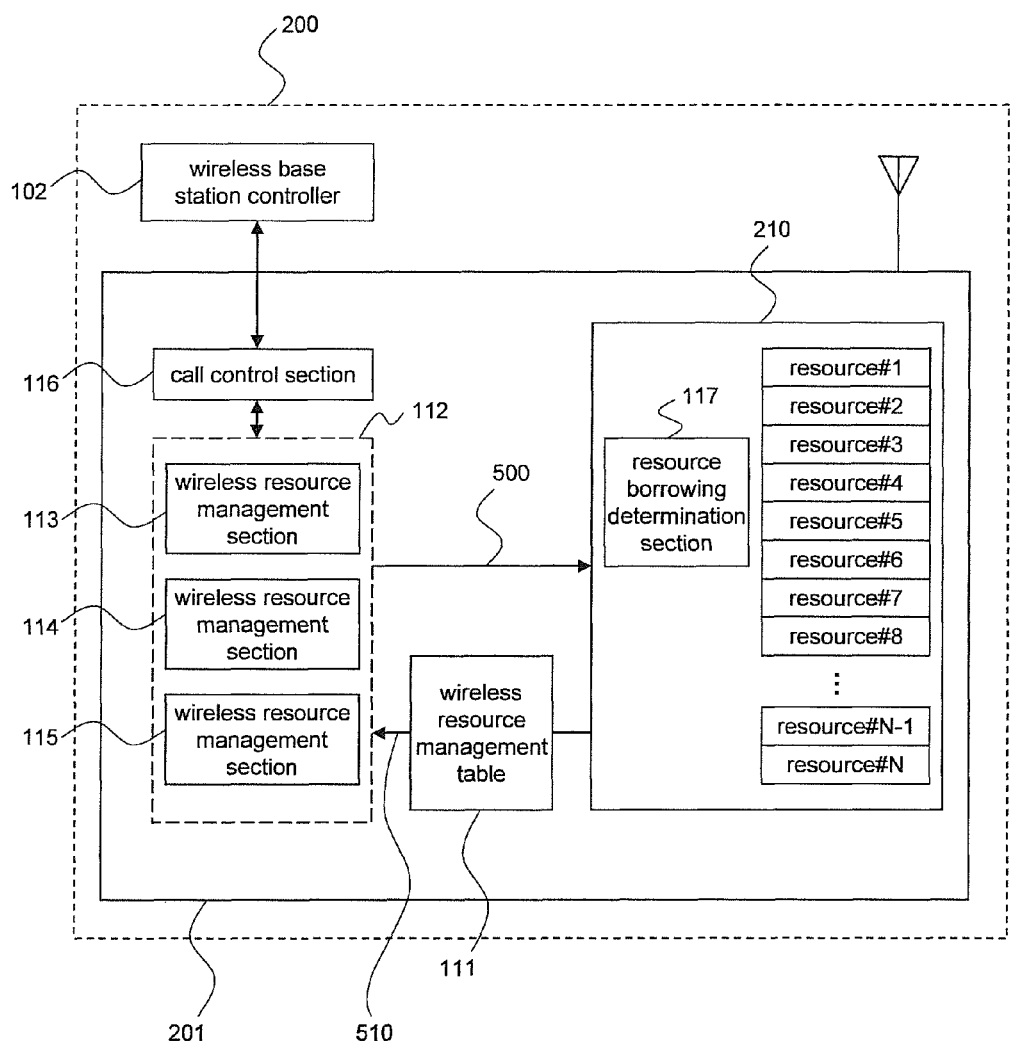
FIG. 5 is a block diagram showing an example of configuration of a wireless base station apparatus in an exemplary embodiment 2 of the present invention.

FIG. 5 is a block diagram showing an example of a configuration of the wireless base station system according to the present exemplary embodiment. The same components as those in exemplary embodiment 1 are indicated by the same reference numerals, and the detailed description for them will not be repeated.

As shown in FIG. 5, wireless base station apparatus 201 in the present exemplary embodiment has call control section 116, wireless resource management section group 112 and wireless resource group 210. Wireless resource group 210 includes resource borrowing determination section 117. Wireless resource management table 111 described in the description of exemplary embodiment 1 is managed on the wireless resource group 210 side.

In the present exemplary embodiment, a CPU which controls call control section 116 and wireless resource management section group 112 and a CPU which controls resource borrowing determination section 117 are provided separately from each other. Programs executed by the CPUs are also stored separately from each other.

Referring to FIG. 5, one of wireless resource management sections in wireless resource management section group 112 transmits resource state inquiry message 500 for inquiry about the states of resources to wireless resource group 210 by being triggered with the reception of the resource setting request signal from wireless base station controller 102 or an arbitrary control cycle of shared service. In response to this, resource borrowing determination section 117 transmits a resource state reply message 510 including information in wireless resource management table 111 to wireless resource management section group 112.

In this case, no particular specification is provided as to which constituent unit updates the various flags. That is, any of the wireless resource management sections in wireless resource management section group 112 and resource borrowing determination section 117 in wireless resource group 210 may update the flags. Updated table information is managed by resource borrowing determination section 117 in wireless resource group 210.

It is not necessarily required that the states of all the resources be reflected in wireless resource management table 111 contained in resource state reply message 510. That is, only information on released resources and resources each having at least one of the reservation flag and the resource borrowing flag set to 1 may be described in the wireless resource management table to be notified to wireless resource management section group 112. The amount of information in resource reply message 510 can be reduced in this way.

Also in the present exemplary embodiment, the same effects as those obtained in exemplary embodiment 1 can be obtained.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless base station apparatus comprising:
a plurality of wireless resources allocated in correspondence with communication processings on three sorts of data: real-time data which is continuous data and which needs to be treated in real time, non-real-time data which is burst data and which does not need to be treated in real time, and shared data used in shared service in which said burst data is transferred in a time-division manner by being communication-processed in a predetermined control cycle; and
a control section for storing a table for recording states of use of said wireless resources, and upon receiving a signal for requesting setting some of said wireless resources for new real-time data, and if no released resource is found as unused one of said wireless resources by referring to said table, for identifying one or more wireless resources allocated for communication processing on said shared data by referring to said table and for allocating part of identified wireless resources for communication processing on said new real-time data, and upon receiving a signal for requesting setting some of said wireless resources for new shared data, and if no released resource is found as unused one of said wireless resources by referring to said table, for identifying one or more wireless resources allocated for communication processing on said non-real-time data by referring to said table and for borrowing part of identified wireless resources for communication processing on said new shared data, wherein priorities are set with respect to said wireless resources allocated to communication processings on said three sorts of data, and wherein, after identifying one or more wireless resources allocated for communication processing on said shared data by referring to said table, said control section sets a reservation flag on some of identified wireless resources with the lowest priority, that releases a wireless resource on which said reservation flag is set, by timing in said control cycle immediately after setting said reservation flag, and that allocates released wireless resource for communication processing on said new real-time data.

2. A wireless base station apparatus comprising:
a plurality of wireless resources allocated in correspondence with communication processings on three sorts of data: real-time data which is continuous data and which needs to be treated in real time, non-real-time data which is burst data and which does not need to be treated in real time, and shared data used in shared service in which said burst data is transferred in a time-division manner by being communication-processed in a predetermined control cycle; and
a control section for storing a table for recording states of use of said wireless resources, and upon receiving a signal for requesting setting some of said wireless resources for new real-time data, and if no released resource is found as unused one of said wireless resources by referring to said table, for identifying one or more wireless resources allocated for communication processing on said shared data by referring to said table and for allocating part of identified wireless resources for communication processing on said new real-time data, and upon receiving a signal for requesting setting some of said wireless resources for new shared data, and if no released resource is found as unused one of said wireless resources by referring to said table, for identifying one or more wireless resources allocated for communication processing on said non-real-time data by referring to said table and for borrowing part of identified wireless resources for communication processing on said new shared data, wherein said control section monitors data flow rate per unit time with respect to each wireless resource allocated for communication processing on said non-real-time data, and that sets a borrowing enable flag on a wireless resource if said data flow rate is lower than a threshold value used as a reference for determination as to whether or not said wireless resource can be borrowed, and after identifying one or more wireless resources allocated for communication processing on said non-real-time data by referring to said table, and that borrows a wireless resource on which said borrowing enable flag is set for communication processing on said new shared data, and that again allocates borrowed wireless resource for communication processing on an original non-real-time data after said communication processing on said new shared data.

3. The wireless base station apparatus according to claim 1, wherein said control section monitors data flow rate per unit time with respect to each wireless resource allocated for communication processing on said non-real-time data, and that sets a borrowing enable flag on a wireless resource if said data flow rate is lower than a threshold value used as a reference for determination as to whether or not said wireless resource can be borrowed, and after identifying one or more wireless resources allocated for communication processing on said non-real-time data by referring to said table, and that borrows a wireless resource on which said borrowing enable flag is set for communication processing on said new shared data, and that again allocates borrowed wireless resource for communication processing on an original non-real-time data after said communication processing on said new shared data.

4. A method of managing wireless resources with a wireless base station apparatus, comprising:
storing a table for recording states of use of a plurality of wireless resources allocated in correspondence with communication processings on three sorts of data: real-time data which is continuous data and which needs to be treated in real time, non-real-time data which is burst data and which does not need to be treated in real time, and shared data used in shared service in which said burst data is transferred in a time-division manner by being communication-processed in a predetermined control cycle; and
upon receiving a signal for requesting setting some of said wireless resources for new real-time data, identifying one or more wireless resources allocated for communication processing on said shared data by referring to said table if no released resource is found as unused one of said wireless resources by referring to said table, and allocating part of identified wireless resources for communication processing on said new real-time data, and upon receiving a signal for requesting setting some of said wireless resources for new shared data, identifying one or more wireless resources allocated for communication processing on said non-real-time data by referring to said table if no released resource is found as unused one of said wireless resources by referring to said table, and borrowing part of identified wireless resources for communication processing on said new shared data, wherein,
setting priorities with respect to said wireless resources allocated to communication processings on said three sorts of data;
identifying one or more wireless resources allocated for communication processing on said shared data by referring to said table, and setting a reservation flag on some of identified wireless resources with the lowest priority;
releasing a wireless resource on which said reservation flag is set by timing in said control cycle immediately after setting said reservation flag; and
allocating released wireless resource for communication processing on said new real-time data.

5. A method of managing wireless resources with a wireless base station apparatus, comprising:
storing a table for recording states of use of a plurality of wireless resources allocated in correspondence with communication processings on three sorts of data: real-time data which is continuous data and which needs to be treated in real time, non-real-time data which is burst data and which does not need to be treated in real time, and shared data used in shared service in which said burst data is transferred in a time-division manner by being communication-processed in a predetermined control cycle; and
upon receiving a signal for requesting setting some of said wireless resources for new real-time data, identifying one or more wireless resources allocated for communication processing on said shared data by referring to said table if no released resource is found as unused one of said wireless resources by referring to said table, and allocating part of identified wireless resources for communication processing on said new real-time data, and upon receiving a signal for requesting setting some of said wireless resources for new shared data, identifying one or more wireless resources allocated for communication processing on said non-real-time data by referring to said table if no released resource is found as unused one of said wireless resources by referring to said table, and borrowing part of identified wireless resources for communication processing on said new shared data, wherein, monitoring a data flow rate per unit time with respect to each wireless resource allocated for communication processing on said non-real-time data, and setting a borrowing enable flag on a wireless resource if said data flow rate is lower than a threshold value used as a reference for determination as to whether or not said wireless resource can be borrowed;

identifying one or more wireless resources allocated for communication processing on said non-real-time data by referring to said table, and borrowing a wireless resource on which said borrowing enable flag is set for communication processing on said new shared data; and allocating borrowed wireless resource again for communication processing on an original non-real-time data after said communication processing on said new shared data.

6. The method of managing wireless resources according to claim 4, wherein, monitoring a data flow rate per unit time with respect to each wireless resource allocated for communication processing on said non-real-time data, and setting a borrowing enable flag on a wireless resource if said data flow rate is lower than a threshold value used as a reference for determination as to whether or not said wireless resource can be borrowed;

identifying one or more wireless resources allocated for communication processing on said non-real-time data by referring to said table, and borrowing a wireless resource on which said borrowing enable flag is set for communication processing on said new shared data; and allocating borrowed wireless resource again for communication processing on an original non-real-time data after said communication processing on said new shared data.

* * * * *